UNITED STATES PATENT OFFICE.

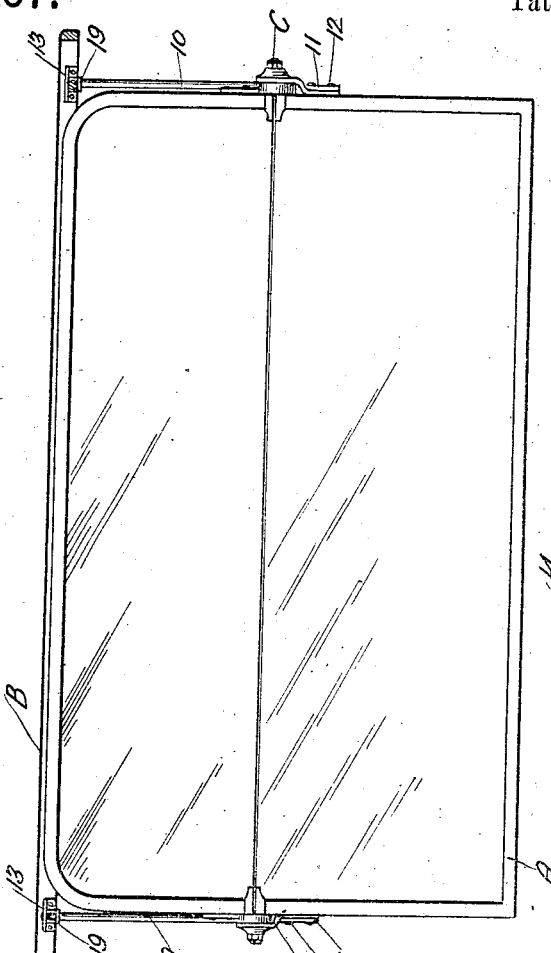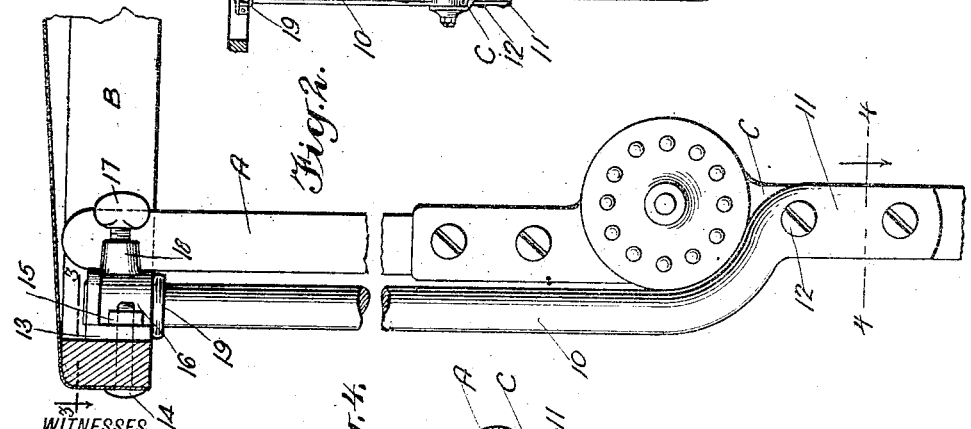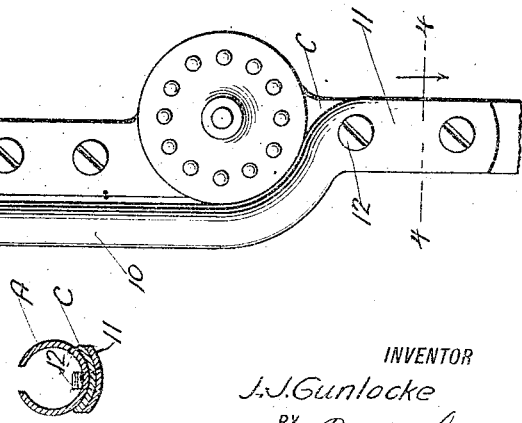

JOSEPH J. GUNLOCKE, OF TACOMA, WASHINGTON.

TOP-SUPPORTING ATTACHMENT FOR WIND-SHIELDS.

1,288,407.

Specification of Letters Patent.  Patented Dec. 17, 1918.

Application filed March 23, 1918. Serial No. 224,309.

*To all whom it may concern:*

Be it known that I, JOSEPH J. GUNLOCKE, a citizen of the United States, and a resident of Tacoma, in the county of Pierce and State of Washington, have invented a new and Improved Top-Supporting Attachment for Wind-Shields, of which the following is a description.

My invention more particularly relates to an attachment for that type of wind shield comprising a lower sash frame and an upper sash frame hinged to the lower sash frame to vary its angular position.

The prime object of my invention is to provide an attachment to prop or support the vehicle top at the front, especially what is known as a one-man top, the attachment having means to detachably secure the same to the lower frame of a wind shield of the indicated type in a manner to prevent interference with the adjustment of the upper wind shield frame, whereby the owner of an automobile having a wind shield of the type indicated may, with facility and despatch and at slight cost, provide proper support for the top and be enabled to remove the attachment from the wind when desired.

Reference is to be had to the accompanying drawings forming part of this specification.

Figure 1 is a front view of the wind shield having my attachement applied thereto at each end, a portion of the top being shown in transverse vertical section;

Fig. 2 is a side elevation of an attachment embodying my invention to a wind shield shown partially in edge view, the view including a longitudinal vertical section of the front portion of a vehicle top;

Fig. 3 is a detail in horizontal section on the line 3—3, Fig. 2;

Fig. 4 is a cross section on the line 4—4, Fig. 2.

In the illustration the letter A indicates a wind shield of that type comprising a lower fixed sash frame and an upper sash frame hinged to the top of the lower frame to be swung to different angular position; the letter B indicates a portion of a one-man top; and C, indicates the usual hinges of wind shields of the type referred to, said hinges each including a hinge element secured to the lower sash frame of the wind shield and a similar hinge element secured to the upper sash frame, the hinge elements being usually secured by screws, as shown.

My attachment includes similar elements at each end of the wind shield. The attachment at each side includes an upright prop 10 and said prop has its lower end 11 offset, said offset lower end being curved in cross section as seen best in Fig. 4 to conform generally to the curvature of the wind shield frame and the lower member of the hinge C. Thus, said lower end 11 is adapted to fit snugly against the said lower hinge member and it is formed with screw holes spaced vertically a distance to correspond with the positions of the screws 12 that secure the lower hinge members C, whereby said screws 12 may be employed to secure the upright 10 to the wind shield. The offsetting of the lower end disposes the body of the prop 10 clear of the upper sash frame of the wind shield and clear of the hinge connection. Thus, the upper sash frame of the wind shield may be adjusted without interference by the prop attachment 10.

The props 10 have a height to be secured to and support the front end of the top B. In the illustrated example a bracket 13 is provided for each prop 10, said bracket being secured by bolts 14 and nuts 15 to the front cross bar of the top. The bracket has a socket 16 through which the upper end of the prop 10 extends, the socket having a set screw 17 operating in a boss 18 on the socket to bind the prop tightly. Below the upper end the prop has a collar 19 on which the socket 16 may rest and thus take the strain off the set screw 17.

By the described arrangement, an automobile having a wind shield of the type in question may be equipped at small cost and expeditiously with my improved top-supporting means and the attachment can be removed when desired.

Having thus described my invention, I claim as new, and desire to secure by Letters Patent:

A top-supporting attachement for automobiles, including a pair of top props having offset lower ends transversely curved to lie against a wind shield frame at the lower hinge members thereof, said curved ends having screw holes positioned to receive the screws of said lower hinge members, said props being adapted to clear the hinge connection of the wind shield, by reason of said offset ends, and the props being of a height to afford support for a vehicle top at the front of the latter, a collar on each of said props at the upper end thereof, and brackets adapted to receive said props above the collars and having means to secure the brackets to the vehicle top.

JOSEPH J. GUNLOCKE.